United States Patent [19]
Anthony

[11] 4,192,716
[45] Mar. 11, 1980

[54] PERIPHERAL PIN ALIGNMENT SYSTEM FOR FUEL ASSEMBLIES

[75] Inventor: Andrew J. Anthony, Tariffville, Conn.

[73] Assignee: Combustion Engineering Inc., Windsor, Conn.

[21] Appl. No.: 869,801

[22] Filed: Jan. 16, 1978

Related U.S. Application Data

[62] Division of Ser. No. 754,625, Dec. 27, 1976, Pat. No. 4,127,445.

[51] Int. Cl.² .............................................. G21C 3/02
[52] U.S. Cl. ........................................ 176/78; 176/68
[58] Field of Search ....................... 176/40, 50, 68, 76, 176/78, 87

[56] References Cited

U.S. PATENT DOCUMENTS

| | | | |
|---|---|---|---|
| 3,166,481 | 1/1965 | Braun | 176/50 |
| 3,379,619 | 4/1968 | Andrews et al. | 176/76 |
| 3,703,437 | 11/1972 | Fortescue et al. | 176/40 X |
| 3,725,199 | 4/1973 | Notari et al. | 176/50 X |
| 3,769,158 | 10/1973 | Winders | 176/78 |
| 3,770,583 | 11/1973 | Klumb et al. | 176/87 X |
| 3,801,734 | 4/1974 | West | 176/50 |
| 3,864,211 | 2/1975 | King et al. | 176/78 |
| 3,996,102 | 12/1976 | Thome | 176/87 |
| 4,006,055 | 2/1977 | Knodler et al. | 176/61 |

FOREIGN PATENT DOCUMENTS 1017401  1/1966  United Kingdom ..................... 176/77

*Primary Examiner*—Peter A. Nelson
*Attorney, Agent, or Firm*—Stephen L. Borst; Eldon H. Luther

[57] ABSTRACT

An alignment system is provided for nuclear fuel assemblies in a nuclear core. The core support structure of the nuclear reactor includes upwardly pointing alignment pins arranged in a square grid and engage peripheral depressions formed in the lateral periphery of the lower ends of each of the fuel assemblies of the core. In a preferred embodiment, the depressions are located at the corners of the fuel assemblies so that each depression includes one-quarter of a cylindrical void. Accordingly, each fuel assembly is positioned and aligned by one-quarter of four separate alignment pins which engage the fuel assemblies at their lower exterior corners.

18 Claims, 10 Drawing Figures

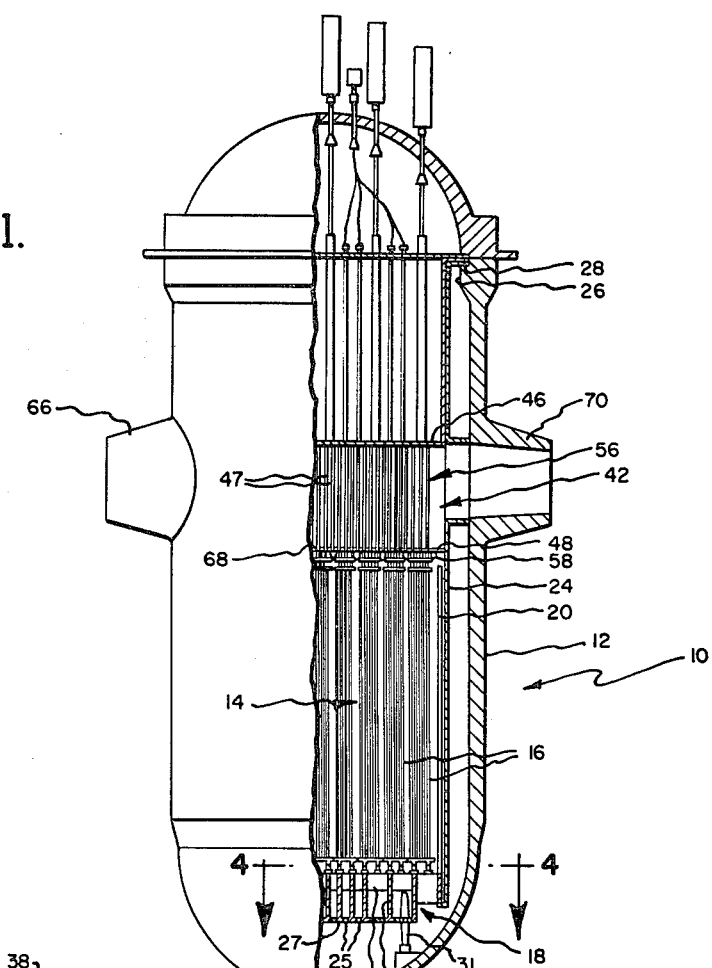
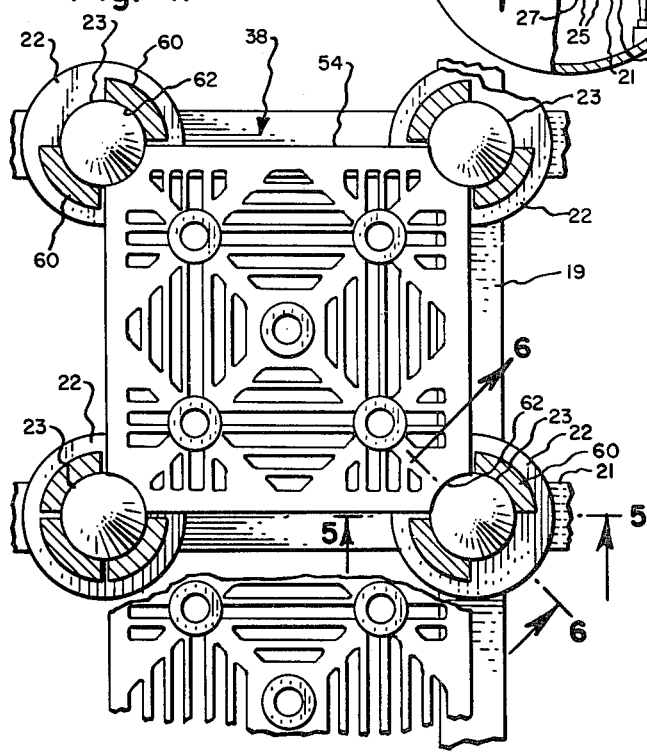
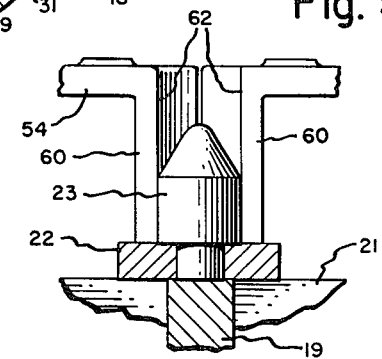
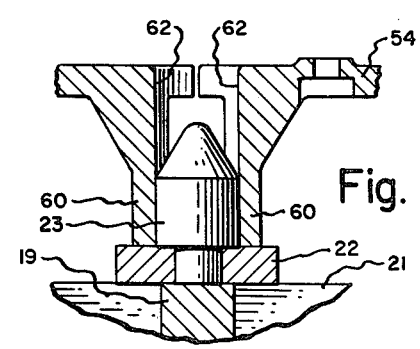

PERIPHERAL PIN ALIGNMENT SYSTEM FOR FUEL ASSEMBLIES

This is a division of application Ser. No. 754,625, filed Dec. 27, 1976 now U.S. Pat. No. 4,127,445, the benefit of filing date of which is hereby claimed.

BACKGROUND OF THE INVENTION

The present invention relates to a method and apparatus for laterally positioning either the lower and/or upper end of a fuel assembly within a core of a nuclear reactor.

Fuel assemblies forming the nuclear core of nuclear reactor are generally comprised of a plurality of elongated fuel rods containing fuel or fissionable material which are grouped and joined together into rectangular fuel assemblies. Each of these rectangular fuel assemblies must be precisely positioned and aligned within the core within predetermined acceptable tolerances. Accordingly, means must be provided within the nuclear reactor vessel to support the nuclear core and the individual fuel assemblies making up the core and to align and position each of these fuel assemblies.

Recently, nuclear reactor fuel assemblies have been made wherein the structural support is provided by vertically extending hollow tubes on the interior of the bundle of fuel rods. These hollow tubes serve as guides for control elements and are secured to upper and lower end plates or end fittings. The fuel rods are aligned and supported within the structural framework formed by the guide tubes and end plates by spacer grids which are attached to the guide tubes and provide both lateral and to some extent axial restraint to the fuel rod. The fuel assemblies themselves are held within the core by upper and lower core support structures normally comprised of upper and lower core support plates positioned transversely of the reactor vessel. The upper and lower end fittings of the fuel assemblies, and the upper and lower core support and alignment plates are provided with means for interfacing with one another in order to provide the necessary support and alignment of the fuel assemblies.

One previously developed means for supporting and aligning the fuel assemblies in the core was to provide the lower core support plate with upwardly facing pins which slidingly fit into extensions of the downwardly directed control rod guide tubes. Alternatively, a previously known arrangement was to provide holes within the lower core support adapted to receive downwardly directed pin-like extensions at the lower ends of the control rod guide tubes. The interface between the upper end fitting of the fuel assembly and the upper guide plate also conventionally comprise a plurality of holes within the upper guide plate adapted to receive upwardly extending extensions of the control rod guide tubes or of portions of the fuel assembly upper end fittings.

In addition to the aligning holes or pins formed in or carried by the upper and lower support plates, these plates also contain flow holes to permit passage of coolant through the plates so that coolant may enter the core at the bottom and exit the core at the top. One of the difficulties with this conventional design is that these upper and lower core alignment and support plates are difficult and expensive to manufacture. In addition, the provision of a plurality of upwardly or downwardly extending pins with the periphery of the cross-section of the fuel assembly creates local areas where coolant flow is impeded from flowing through the core support plates and through the fuel asemblies themselves. Accordingly, a core support and fuel assembly design is desired which avoids these difficulties and which is easier and less expensive to manufacture.

SUMMARY OF THE INVENTION

According to the present invention, there is provided a fuel assembly design and a core support structure which is stronger, provides better alignment with closer tolerances, has lower coolant flow inpedance and therefore creates a lower pressure drop and improves the thermal margin of the core and improves the leadin capability of the fuel assemblies during refueling in comparison to the conventional prior art design. The new design of the present invention provides a lower core support structure consisting essentially of beams which form a grid network. Small pads and alignment pins are welded or otherwise affixed to the tops of the beams to provide support and alignment of the fuel assemblies. The fuel assemblies themselves are provided with peripheral depressions in their lower end fittings adapted to receive portions of the upwardly extending alignment pins.

In the preferred embodiment, the alignment pins are arranged in a square matrix and the fuel assemblies have peripheral depressions located at the corners of their lower end fittings. With this arrangement, each corner of each fuel assembly engages one-quarter of one alignment pin. Accordingly, only one total alignment pin is required for each fuel assembly located to the interior of the core.

The same single pin per fuel assembly concept has been adapted for use at the upper core support plate and at the upper fuel assembly end fitting. Accordingly, the upper end fitting of the fuel assemblies may be provided with corner peripheral depressions adapted to engage one-quarter of an alignment pin which projects downwardly from the upper core alignment plate. In one possible variation, the downwardly facing alignment pins of the upper core alignment plate may be spring mounted so that depression of the springs of the alignment pins can be utilized to provide a fuel assembly hold-down force. In another arrangement, a portion of the upper end fitting of the fuel assembly may be spring mounted rather than the alignment pins thereby providing the holddown force for the fuel assembly.

BRIEF DESCRIPTION OF THE DRAWINGS

FIG. 1 is an elevation view partly in section of a nuclear reactor incorporating the present invention.

FIGS. 4, 4a, 4b and 4c are plan and diagrammatical plan views of alternate embodiments taken for example along the line 4—4 of FIG. 1.

FIGS. 5 and 6 are sections of FIG. 4 taken along lines 5—5 and 6—6 respectively showing the corner structure of two lower end fittings and their engagement with an alignment pin.

DESCRIPTION OF THE PREFERRED EMBODIMENT

Figure 2:
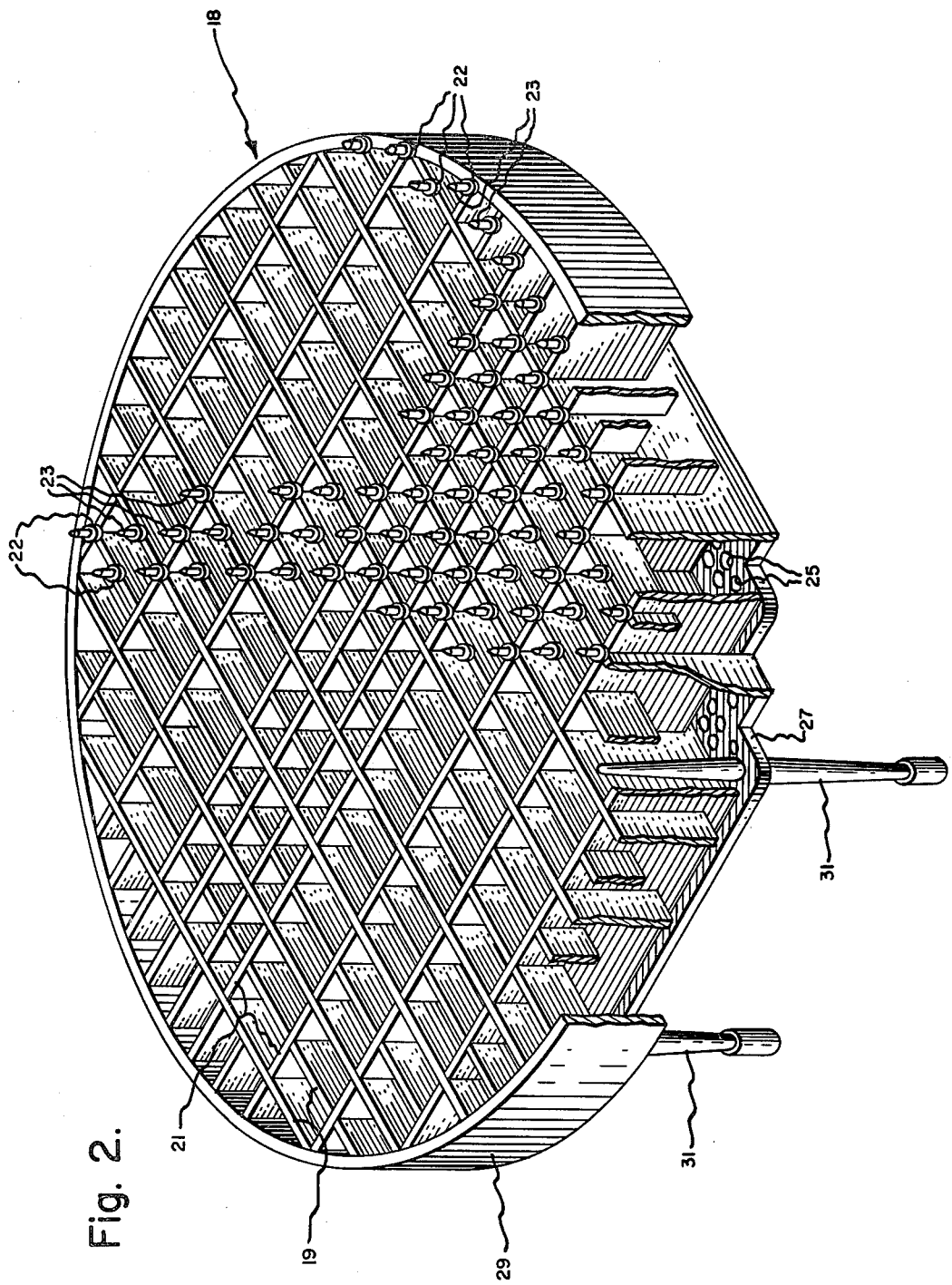
FIG. 2 is a perspective view of the lower core support structure of the preferred embodiment of the present invention.

Referring now to FIG. 1, there is shown a nuclear reactor 10 including a reactor vessel 12 having an active core or fuel region 14 therein. The core 14 comprises a plurality of longitudinally extending, regularly spaced, vertically disposed fuel assemblies 16 that are supported in position by a lower support structure 18 which permits the flow of fluid coolant therethrough to the core 14. A core support shroud 20 surrounds the core 14 and depends upwardly from the lower support structure 18. The lower support structure 18 and the entire core assembly 14 are vertically supported by support legs 31 and by the core support barrel 24: the latter being suspended from the vessel flange 26 by an out-turned lip 28 that engages the flange.

Figure 3:
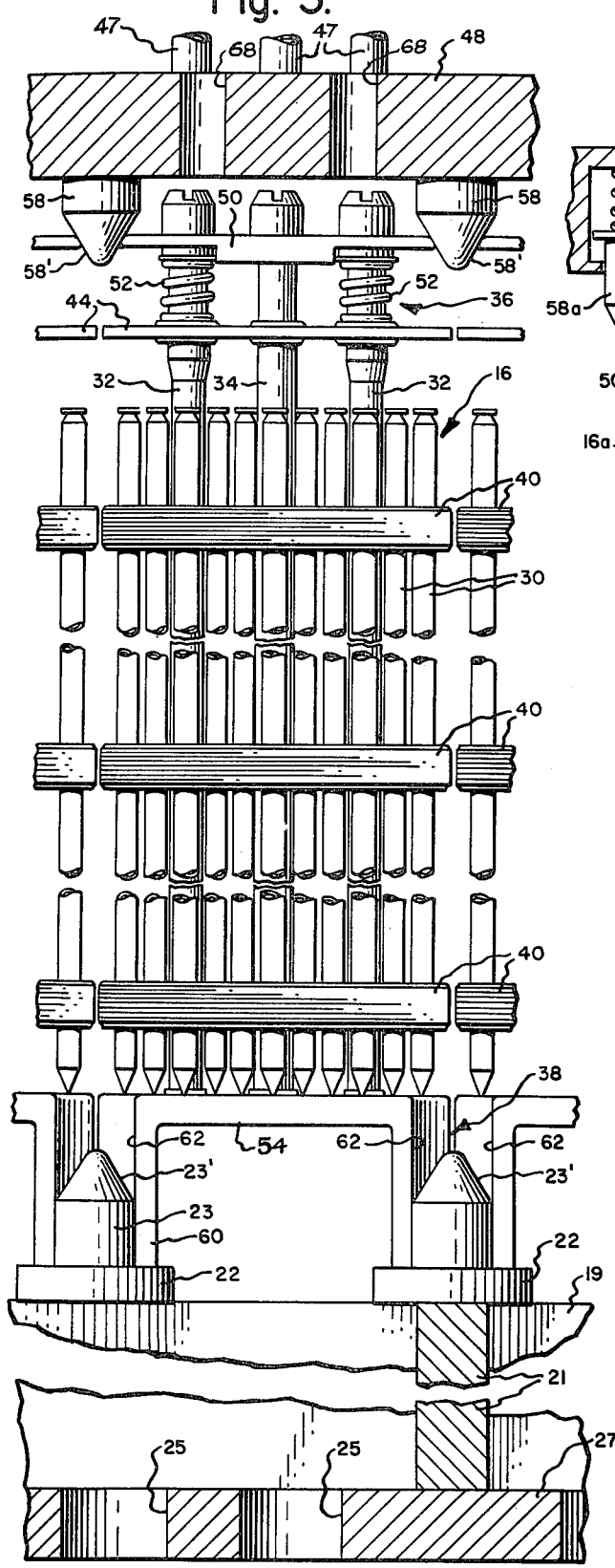
FIG. 3 is a fragmentary side view of a portion of the core and support structure as it supports and aligns a fuel assembly of the core.

In general, and as best seen in FIG. 3, the fuel assemblies 16 each include a plurality of longitudinally extending fuel elements 30 and a plurality of hollow guide tubes 32, 34 interspersed between and within the array of fuel elements 30. In the arrangement shown, the fuel assemblies 16 each contain four vertically extending outer guide tubes 32 which are arranged adjacent to the four corners of fuel assembly 16 and which are attached to upper and lower end fittings 36, 38. A fifth guide tube 34 is centrally located within each of the fuel assemblies 16 and is also attached to the upper and lower end fittings 36, 38. The guide tubes 32, 34 may all extend above the upper end fitting 36 but terminate at the lower end fittings 38. The guide tubes 32, 34 and the upper and lower end fittings 36, 38 provide the structural framework for the fuel assembly 16.

A plurality of generally rectangularly arranged spacer grids 40 are suitably secured to the guide tubes 32, 34 at spaced elevations therealong. The spacer grids 40 serve to support the plurality of parallel fuel elements 30 in vertical disposition. The grids 40 are of conventional design and include, as is well known, an array of mutually aligned rectangularly arranged openings through which the fuel elements 30 extend.

Located above the core region 14 is a guide structure 42 that serves to align the top end of the fuel assemblies 16 and also to guide control elements (not shown) into and out of the core region 14. The guide structure assembly 42 is described genrally in the U.S. Pat. No. 3,849,257 entitled "GUIDE STRUCTURE FOR CONTROL ELEMENTS" filed June 28, 1972, an understanding of the details of which is not necessary for this application. The guide structure assembly 42 generally comprises a pair of vertically spaced tube sheets or plates 46, 48 with intermediate tubes 47. Plate 48 substantially overlies the entire core 14 and acts as an upper core alignment and support plate.

As best seen in FIG. 2 the lower core support structure 18 comprises a plurality of support members or beams 19 running in one direction and a second plurality of support members or beams 21 running transversely thereto. Beams 19 and 21 are notched or slotted so that they may be assembled into a grid network of crossed support members as illustrated. Beams 19 and 21 are supported from a peripheral band 29 which in turn interfaces with the core support barrel 24. Additionally, a select number of beams 19 and 21 extend downwardly to support a coolant flow distribution plate 27 having coolant flow distribution holes 25 therethrough. On the upper surfaces of beams 19 and 21 there are welded or otherwise affixed metal pads 22 and longitudinally extending alignment pins 23. Pads 22 and pins 23 are arranged in a square matrix with a modulus or separation distance equal to the width of the fuel assemblies 16. With this arrangement, the fuel assemblies 16 in the core 14 may be arranged above and supported by the core support structure 18 in such a manner that the intersection of four adjacent fuel assemblies 16 lies above one of the pins 23. Accordingly, pins 23 support and align the bottom portion of the fuel assemblies 16 and pads 22 act as support members upon which the fuel assembly 16 rests.

During normal operation of the reaction 10, liquid coolant, which is usually water, enters the reactor 10 through the inlet nozzles 66 and flows downwardly around the outside of the core support barrel 24. The coolant then flows inwardly and up through openings 25 in the coolant flow distribution plates 27. Due to the open structure of the grid formed by beams 19 and 21, a fairly uniformly distributed flow of coolant exists across the core support structure 18. As the coolant flows upwardly through the reactor core 14, it extracts heat generated therein from the nuclear fission in the fuel assemblies 16. The heated coolant then flows up through openings 68 in the lower tube sheet 48 into the outlet region 56 located between the two tube sheets 46, 48. From the outlet region 46, this fluid is passed through the outlet nozzles 70 and is conducted to a vapor generator or the like (not shown) where it serves as the operating medium for heating vaporizable liquids supplied thereto.

The lower end fitting 38 is comprised essentially of a lower end plate 54 having alignment posts 60 connected thereto and depending downwardly therefrom. In the preferred embodiment, the alignment posts 60 are located at the corners of the lower end fittings of the square fuel assembly and contain inwardly directed depressions 62. These inwardly directed depressions 62 are generally of a conical form and amount to one-quarter of a cylindrical void. The cylindrical depressions 62 are adapted to engage and receive therewithin at least a portion of the cylindrical upwardly extending alignment pin 23. Thus, each alignment post 60 is adapted to slidingly fit next to and receive partially therewithin an alignment pin 23 so that the four corner alignment posts 60 each engage and are positioned by one of four corner alignment pins 23. The four corner alignment posts 60 also each rest on one of the pads 22. The lower end plate 54 contains a plurality of various sized and shaped openings (FIG. 4) which permit the free flow of coolant fluid therethrough during normal operation of the reactor to cool and remove heat generated by the fuel.

Alignment pins 23 are shown to be of a cylindrical shape with an upwardly facing conical section 23'. It should be recognized however, that the figures only show a preferred embodiment and it is conceivable that alignment pins 23 have a shape other than a cylindrical shape. By the same token, the downwardly directed alignment posts 60 may have a variety of shapes including a recess 62 which includes flat surfaces and angles such as the corner of a square void. It is therefore conceivable that the alignment posts 62 may be of the shape of an angle iron with engagement with the cylindrical pin being along only two lines of contact.

Another feature of interest which should be recognized is that the upwardly directed conical section 23' of pins 23 act as camming surfaces for guiding the fuel assembly into its proper position during the loading process. In this respect, the design of the present invention is advantageous over the prior art in that with the alignment pins 23 located at the periphery of the fuel assemblies, and with fewer total alignment pins per fuel assembly, wider alignment pins 23 can be incorporated so that the camming surface 23' has a greater lateral reach than found in previously known designs. This camming surface 23' has great significance where the core of the reactor has been designed to withstand large seismic forces. In such a core, the spacer grids 40 are more substantial and intentionally project outwardly from the envelope of the fuel assembly to a greater degree in order to reduce the separation between adjacent assemblies in the core. With this arrangement there would be a greater tendency for the spacer grids to catch or hang-up on an adjacent fuel assembly spacer grid during the loading process. Accordingly, the camming surface 23' increased dimension permits the fuel assembly to be lowered into its position while maintaining a greater separation between it and its neighboring fuel assembly than has previously been possible.

Figure 4A:
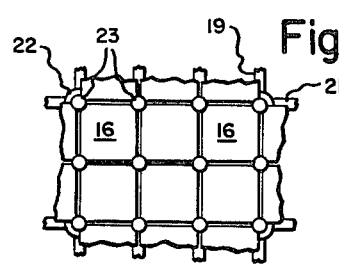

FIG. 4 shows a core arrangement which has been made possible by the present invention and which is the preferred embodiment of the present invention. In this preferred embodiment the alignment pins 23 are arranged in a rectangular array or a square array with a separation or modulus which is equivalent to the lateral dimensions of the rectangular or square fuel assemblies 16. As has previously been described, the lower end fittings 38 of the fuel assemblies 16 have their alignment posts 60 at the corners thereof and include lateral depressions 62 which assume the shape of one-quarter of a cylindrical void. With this arrangement, the fuel assemblies 16 may be arranged in a core in a manner which places the corners of the fuel assemblies 16 and the downwardly extending alignment posts 60 above and next to the alignment pins 23 respectively. Since each alignment post 60 receives only one-quarter of an alignment pin 23, it can be seen that only one total pin per fuel assembly is required for those fuel assemblies found in the interior of the core. One pin per fuel assembly is a substantial reduction over the number of pins required by prior art devices and represents a substantial savings in both materials and cost of production.

Figure 4B:
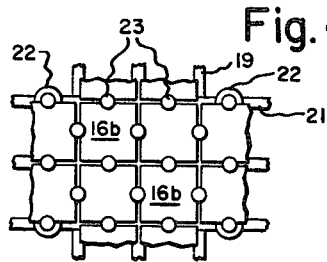

FIG. 4b shows an alternate embodiment in which the pins are not located at the corners of the fuel assemblies but in which the pins are located along the sides of the fuel assemblies. In such an arrangement, the alignment posts would be located at the sides of the fuel assemblies rather than at the corners and would be adapted to receive one-half of the pin rather than one-quarter. This arrangement results in two total pins per fuel assembly in the interior of the core.

Figure 4C:
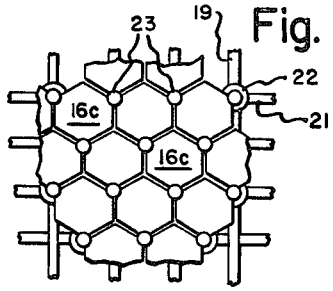

FIG. 4c also shows a modification of the preferred embodiment in which the fuel assemblies 16c are hexagonal rather than square. In such an arrangement and with fuel assemblies such as shown at 16c, the pins would once again be located at the corners of the fuel assemblies. In the arrangement shown in FIG. 4c, one pin is provided for each fuel assembly since each corner of the hexagonal fuel assembly engages and receives one-third of the pin.

A number of other modifications to these designs are possible and are within the scope of the invention. As an example, one further alternate design would place alignment pins only at two diagonally opposite corners. Thus, whereas each alignment pin would serve to position and align four fuel assemblies, each fuel assembly would engage only two alignment pins so that there would be a total of only one-half of a pin per fuel assembly.

Looking now at the upper end of the fuel assembly in FIG. 3, the upper end fitting 36 essentially comprises an upper end plate 44 extending transversely of the vertically extending guide tubes 32 and 34, a hold-down plate 50 extending transversely of the guide tubes and being generally parallel to and spaced from the upper end plate 44, and a coil spring means held in compression such as coil spring 52 and acting between the hold-down plate 50 and the upper end plate 44. When the core of the nuclear reactor is assembled, a means is provided to bear againt the hold-down plate 50 so that springs 52 are compressed thereby providing a downwardly directed force against the upper end plate 44. This downwardly directed force prevents the force of the flow of the coolant through the fuel assembly 16 from lifting it off of the support pads 22.

In the embodiment shown in FIG. 3, the means provided to bear against the upper hold-down plate 50 comprises the upper core alignment and support plate 48 and upper alignment pins 58. Upper alignment pins 58 are longitudinally and downwardly directed with a cylindrical section and a conical section 58'. The hold-down plate 50 of the fuel assembly is provided with lateral depressions having a downwardly and outwardly tapering conical shape. In a manner similar to the lower end fitting, these lateral depressions in the upper end fitting may be positioned either at the corners thereof or at the sides.

Figure 3A:
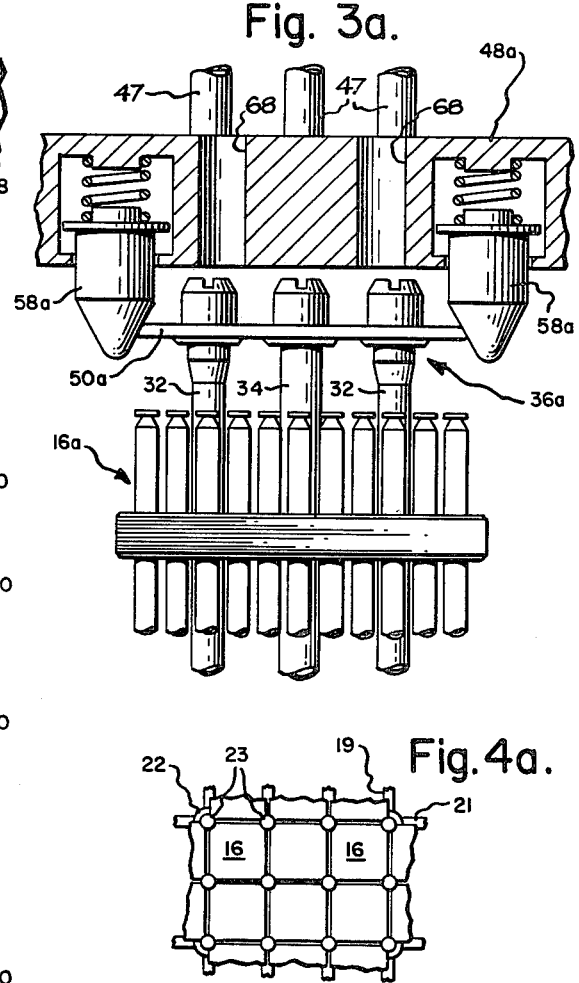
FIG. 3a is a partial side view of the upper end fitting of a fuel assembly showing an alternate embodiment.

An alternate embodiment is disclosed in FIG. 3a in which the upper end fitting 36a is simplified by including a plate 50a which operates both as the core hold-down plate and as the upper end plate of the fuel assembly 16. In this embodiment, the alignment pins 58a depend from the upper core alignment plate 48a and are spring loaded to bear against the fuel assembly 16a and to provide the core hold-down force.

What is claimed is:

1. An improved nuclear reactor of the type having a vessel containing a core therewithin, said vessel and said core having parallel longitudinal axes, the improvement comprising:
  (a) a nuclear core comprising a multiplicity of longitudinally extending, regularly spaced, vertically disposed fuel assemblies, each of said fuel assemblies having a plurality of depressions provided in its lateral periphery; and
  (b) a core support structure disposed within said vessel for supporting and aligning said multiplicity of fuel assemblies, said core support structure including longitudinally extending alignment pins engaging said depressions of said fuel assemblies.

2. The improved nuclear reactor as recited in claim 1 wherein said fuel assemblies include lower end fittings in which depressions are provided, and wherein said core support structure includes a lower core support structure from which said alignment pins extend in an upward direction.

3. The improved nuclear reactor as recited in claim 2 wherein said lower end fittings include downwardly directed alignment posts, said depressions comprising inwardly directed recesses in said alignment posts for receiving at least a portion of one of said alignment pins.

4. The improved nuclear reactor as recited in claim 3 wherein said alignment pins have a cylindrical section.

5. The improved nuclear reactor as recited in claim 3 wherein said fuel assemblies and said lower end fittings have square cross-sections and wherein said alignment posts are located at the corners of said lower end fittings, said downwardly directed alignment posts having concave recesses comprising one-quarter of a cylindrical void.

6. The improved nuclear reactor as recited in claim 5 wherein said alignment pins have a cylindrical section adapted to fit in part into said cylindrical void, and said alignment pins being uniformly distributed on said core support structure in a square matrix whereby each fuel assembly is engaged and positioned by at least two of said alignment pins and whereby at least some of said alignment pins engage and position four adjacent fuel assemblies.

7. The improved nuclear reactor as recited in claim 3 wherein said fuel assemblies and said lower end fitting have square cross-section and wherein said alignment posts are located at the sides of said lower end fittings, said depressions comprising one-half of a cylindrical void.

8. The improved nuclear reactor as recited in claim 7 wherein said alignment pins have a cylindrical section adapted to fit in part into said cylindrical void, and said alignment pins being uniformly distributed on said core support structure in a square matrix whereby each fuel assembly is engaged and positioned by at least two of said alignment pins and whereby at least some of said alignment pins engage and position two adjacent fuel assemblies.

9. The improved nuclear reacter as recited in claim 2 wherein said lower core support structure includes a grid of crossed support members.

10. The improved nuclear reactor as recited in claim 5 wherein said lower core support structure includes a grid of crossed support members.

11. The improved nuclear reactor as recited in claim 3 wherein said fuel assemblies and said lower end fittings have hexagonal cross-sections and wherein said alignment posts are located at the corners of said lower end fittings, said depressions comprising one-third of a cylindrical void.

12. The improved nuclear reactor as recited in claim 1 wherein each of said fuel assemblies include an upper end fitting in which said depressions are provided, and wherein said core support structure includes an upper core support structure from which said alignment pins extend in a downward direction.

13. The improved nuclear reactor as recited in claim 12 wherein said upper end fitting includes an upper end plate, said lateral depressions having a downwardly and outwardly tapering conical shape, and further wherein said downwardly extending alignment pins have a downwardly pointing conical section for engaging and camming against said downwardly and outwardly tapering conical depression.

14. The improved nuclear reactor as recited in claim 13 wherein said upper end fitting includes means for resiliently biasing said upper end plate in an upward direction in order to resiliently urge said upper end plate against said downwardly pointing conical alignment pins.

15. The improved nuclear reactor as recited in claim 13 wherein said upper core support structure includes means for resiliently biasing said alignment pins in a downward direction in order to resiliently urge said alignment pins against said upper end plates of said fuel assemblies.

16. The improved nuclear reactor as recited in claim 1 wherein at least some of said alignment pins engage peripheral depressions of a plurality of adjacent fuel assemblies.

17. The improved nuclear reactor as recited in claim 16 wherein said at least some of said alignment pins engage the peripheral depressions of four adjacent fuel assemblies.

18. The improved nuclear reactor as recited in claim 1 wherein said alignment pins have a cylindrical section and a conical section.

* * * * *